United States Patent [19]
Mori et al.

[11] Patent Number: 5,500,039
[45] Date of Patent: Mar. 19, 1996

[54] GAS-LIQUID SEPARATING APPARATUS

[75] Inventors: Yasushi Mori; Tokuji Matsuo; Nobuhiro Hokao, all of Nagasaki; Akihiko Fujimoto, Tokyo; Tsuyoshi Sato, Nagasaki, all of Japan

[73] Assignee: Mitsubishi Jukogyo Kabushiki Kaisha, Tokyo, Japan

[21] Appl. No.: 277,311

[22] Filed: Jul. 22, 1994

[30] Foreign Application Priority Data

Jul. 23, 1993 [JP] Japan ................... 5-182662

[51] Int. Cl.⁶ ............................................ B01D 19/00
[52] U.S. Cl. .................... 96/209; 55/337; 55/459.1; 95/261; 95/262; 96/220
[58] Field of Search ............... 55/337, 447, 459.1, 55/462; 95/261, 262, 271; 96/195, 197, 209, 216, 220

[56] References Cited

U.S. PATENT DOCUMENTS

| | | | |
|---|---|---|---|
| 2,539,019 | 1/1951 | Hill | 55/459.1 |
| 2,782,772 | 2/1957 | Blaser | 55/459.1 |
| 3,304,697 | 2/1967 | Ramsey | 55/459.1 |
| 3,548,569 | 12/1970 | Jepsen | 55/459.1 |
| 3,928,003 | 12/1975 | Fryar | 95/261 |
| 4,053,291 | 10/1977 | Sims | 96/209 |
| 4,093,428 | 6/1978 | Swogger | 96/209 |

FOREIGN PATENT DOCUMENTS

| | | |
|---|---|---|
| 896493 | 11/1953 | Germany . |
| 97289 | 4/1973 | Germany . |
| 55-119954 | 9/1980 | Japan ........................... 96/209 |
| 2126499 | 3/1984 | United Kingdom . |

*Primary Examiner*—C. Scott Bushey
*Attorney, Agent, or Firm*—Wenderoth, Lind & Ponack

[57] ABSTRACT

A gas-liquid separating apparatus for separating gas and liquid of a gas-liquid mixture includes a drum, and a separator disposed in the drum. The gas-liquid enters the separator into a cylinder of the separator in a tangential direction, and thus flows along the inner wall surface of the cylinder so that centrifugal separation of the gas and liquid is effected. The gas is discharged into a gas-phase section of the drum. At least part of the primary isolated liquid is decelerated by a perforated plate of the separator from which the liquid flows into a liquid-phase section of the drum. Because the primary isolated liquid flowing into the liquid-phase section of the drum has a slow outflow velocity, it tends to flow upwardly in the vicinity of the cylinder due to the buoyancy of gas still entrained in the liquid. Accordingly, the gravitational separation of the entrained gas and liquid is facilitated.

8 Claims, 4 Drawing Sheets

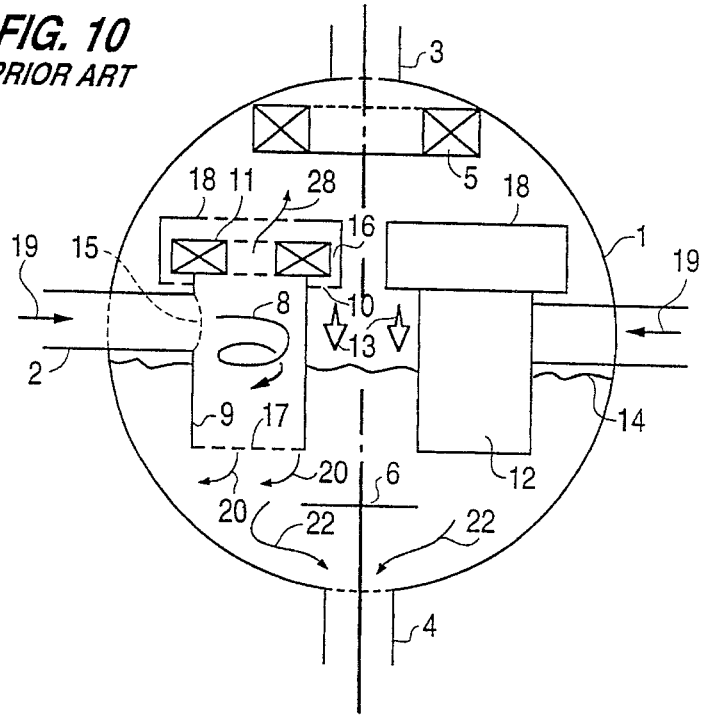
FIG. 10
PRIOR ART
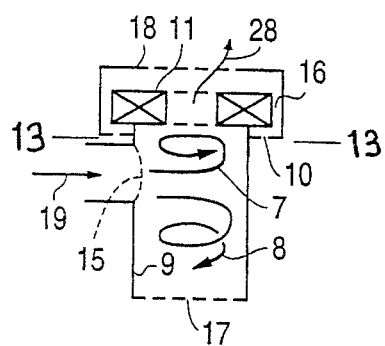
FIG. 11
PRIOR ART
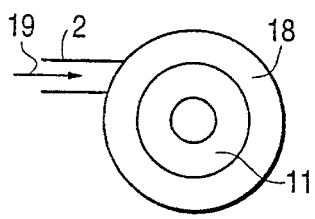
FIG. 12
PRIOR ART
FIG. 13
PRIOR ART

GAS-LIQUID SEPARATING APPARATUS

BACKGROUND OF THE INVENTION

1. Field of the Invention

The present invention relates to a gas-liquid separating apparatus applicable to an electric power plant or the like.

2. Description of the Prior Art

One example of a gas-liquid separating apparatus in the prior art is shown in FIGS. 10 to 13.

This apparatus includes a separator 12 disposed within a drum 1 as shown in FIG. 10. The right half of FIG. 10 shows the outer appearance of the separator 12, while the left half shows the separator 12 in section. Furthermore, a mist separator 5, a rectifier plate 6 for preventing vortexes, and the like are provided within the drum 1.

As shown mainly in FIGS. 11 and 12, the separator 12 includes a cylinder 9, a cap 18 and a secondary separator 11. This secondary separator 11 consists of a stack of corrugated plates or of a structure having the profile of a fan blade.

Now, the flow of gas-liquid mixture in the apparatus will be described. In FIG. 10, a gas-liquid mixture 19 fed from a boiler evaporator tube enters a separator inlet 15 through inlet piping 2. The gas component of this gas-liquid mixture is steam, and the liquid component is water. The gas-liquid mixture 19 fed through the separator inlet 15 enters the cylinder 9 in a direction tangential to the cylinder 9 as shown in FIG. 13, and thus flows, as designated by reference numeral 8, along the inner wall surface of the cylinder 9, whereby centrifugal separation of the gas and liquid is effected. The separated steam is discharged from the secondary separator 11 through a cap 18 to a gas-phase section of the drum 1 as designated by reference numeral 28 in FIG. 10. Also, the separated liquid flows out from a primary isolated water outlet 17 to a liquid-phase section of the drum 1 as primary isolated water 20.

It is to be noted that because the centrifugal separation in the cylinder 9 is not sufficient, as shown in FIG. 11, liquid 7 also flows into the secondary separator 11. As shown in FIG. 10, the liquid 7 flows through a gap 16 and out the bottom 10 of the cap 18 as secondary isolated water 13. This water 13 drips onto a gas-liquid boundary surface 14 within the drum. Likewise, steam is also entrained in the primary isolated water 20 flowing from the primary isolated water outlet 17 into the liquid-phase section of the drum. The steam in the gas-phase section of the drum 1 is fed from a mist-separator 5 through steam outlet piping 3 to, for instance, a turbine. The liquid in the liquid-phase section is rectified by a rectifier plate 6 to prevent the formation of vortices, and thereafter it is returned to, for instance, an inlet of the boiler evaporator tube through a down comer 4.

In the prior art, the primary isolated water 20 flowing from the primary isolated water outlet 17 and containing steam, enters the liquid-phase section of the drum 1 as shown in FIG. 10 while retaining a velocity in a rotary direction associated with the flow 8. Due to this velocity and the force of gravity, the primary isolated water 20 flowing out from the primary isolated water outlet 17 swirls in the same direction as the flow 8. Due to this flow, strong and fast in-drum liquid flows 22 are directed from the primary isolated water outlet 17 towards the down comer 4. Hence, the primary isolated water 20 flowing out from the primary isolated water outlet 17 is drawn into the in-drum liquid flow 22 in a short period of time, and flows through the down comer 4.

Therefore, the prior art gas-liquid separating apparatus has a disadvantage in that the time available for gas-liquid gravitational separation of the primary isolated water 20 containing steam in the liquid phase section of the drum 1 is not sufficient. Hence it was difficult to achieve gas-liquid separation with high efficiency.

In addition, a gas column is formed at a central portion of the cylinder 9 as a result of the swirling flow 8. Depending upon the flow rate of the gas-liquid mixture 19, sometimes the bottom of the gas column would reach below the primary isolated water outlet 17, and a large amount of steam would directly flow into the liquid-phase section of the drum 1. Therefore, the prior art gas-liquid separating apparatus also has a disadvantage in that highly efficient gas-liquid separation could be achieved only over a small range of flow rates.

SUMMARY OF THE INVENTION

It is therefore one object of the present invention to provide an improved gas-liquid separating apparatus which can achieve gas-liquid separation in a favorable manner.

Another object of the present invention is to provide an improved gas-liquid separating apparatus which can effect a highly efficient gas-liquid separation over a wide range of flow rates.

In order to achieve the first object, a gas-liquid separating apparatus of the present invention includes a separator having a cylinder for separating gas and liquid of a gas-liquid mixture with the aid of centrifugal forces, and a container in which the separator is disposed, wherein the separator is provided with a perforated plate at a primary isolated liquid outlet of the cylinder of the separator.

According to another feature of the present invention, a rectifier, consisting of an outflow diverting section, vortex preventing plates and the perforated plate may be provided at the primary isolated liquid outlet.

Because a perforated plate is provided at the primary isolated liquid outlet of the cylinder of the separator, primary isolated liquid of the flow swirling in the cylinder has its outflow velocity decreased. Thereafter, this liquid flows directly into the liquid-phase section of the drum. As a result, the flow velocity of the liquid in the liquid phase section of the drum is low. Accordingly, the time in which gas-liquid gravitational separation occurs in the liquid-phase section of the drum is longer than in the heretofore known apparatus.

Also, when using the rectifier, primary isolated liquid of the flow swirling in the cylinder is diverted from flowing toward the down comer (outlet) of the container by the outflow diverting section. Subsequently, the swirling of the liquid about the center axis of the cylinder of the separator is stopped by the vortex preventing plates. Furthermore, the velocity of the liquid flowing into the liquid-phase section of the drum is decreased by the perforated plate. In this way, the gas column within the cylinder is formed stably due to the flow resistances generated by the outflow diverting section, the vortex preventing plates and the perforated plate. Consequently, gas-liquid separation at a high efficiency can be realized over a wider range of flow rates than in the case of the prior art.

The above-mentioned and other objects, features and advantages of the present invention will become more apparent by referring to the following description of preferred embodiments of the invention made in conjunction with the accompanying drawings.

BRIEF DESCRIPTION OF THE DRAWINGS

In the accompanying drawings:

FIG. 10 is a vertical sectional view of a gas-liquid separating apparatus in the prior art;

FIG. 11 is a longitudinal sectional view of a separator employed in the gas-liquid separating apparatus shown in FIG. 10;

FIG. 12 is a plan view of the separator shown in FIG. 11; and

FIG. 13 is a transverse sectional view taken along line 13—13 in FIG. 11.

DETAILED DESCRIPTION OF THE PREFERRED EMBODIMENTS

Figure 1:
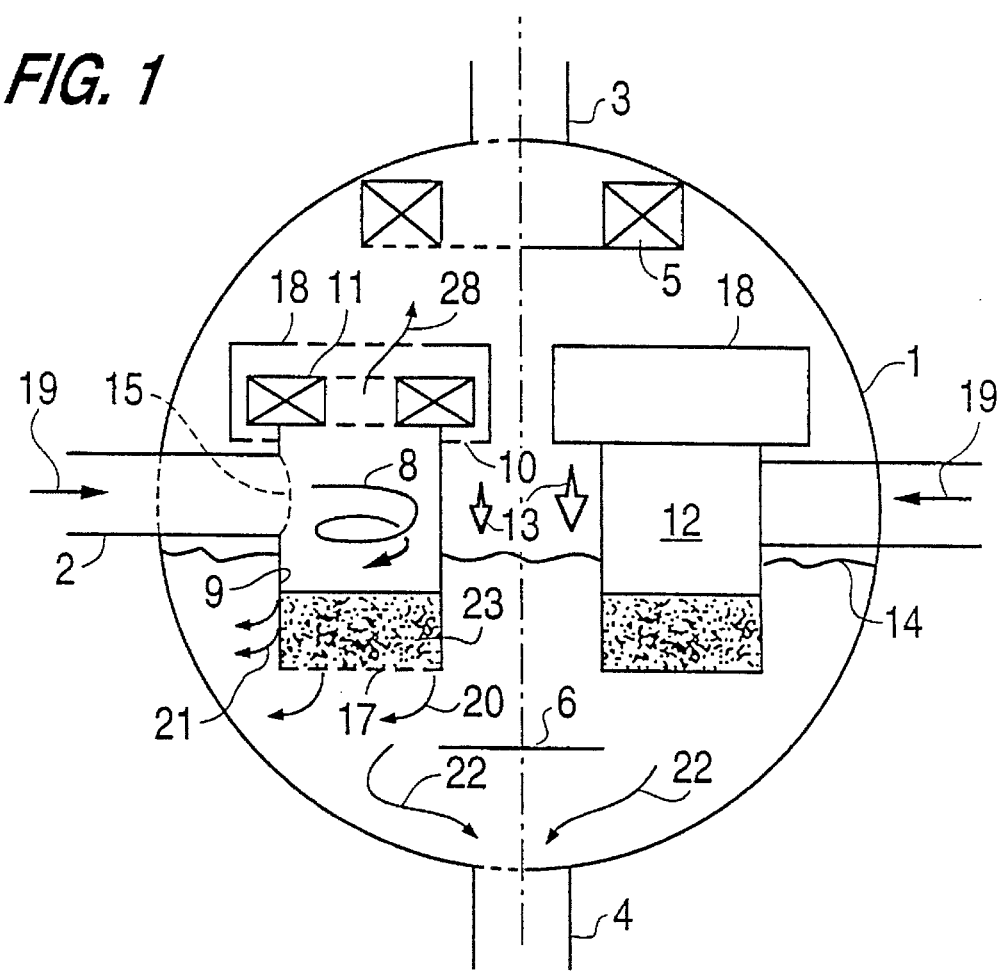
FIG. 1 is a vertical sectional view of a first preferred embodiment of a gas-liquid separating apparatus according to the present invention.

In the following, the gas-liquid separating apparatus according to the present invention will be described in greater detail on the basis of the illustrated preferred embodiments. In the preferred embodiments described hereunder, parts similar to those of the heretofore known apparatus shown in FIGS. 10 to 13 are designated by like reference numerals, and a detailed description thereof will be omitted.

First Preferred Embodiment

Figure 2:
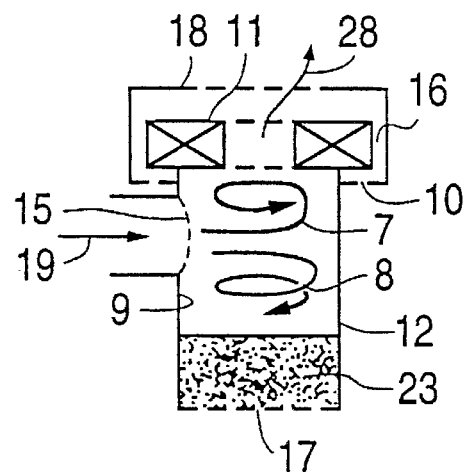
FIG. 2 is a longitudinal sectional view of a separator employed in the gas-liquid separating apparatus shown in FIG. 1.
Figure 3:
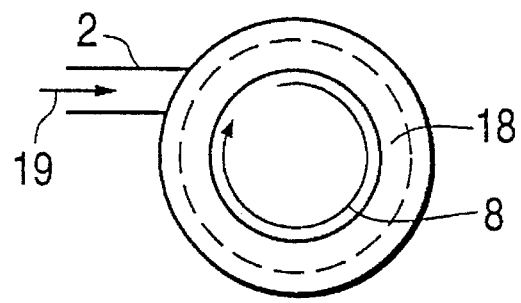
FIG. 3 is a plan view of the separator shown in FIG. 2.
Figure 4:
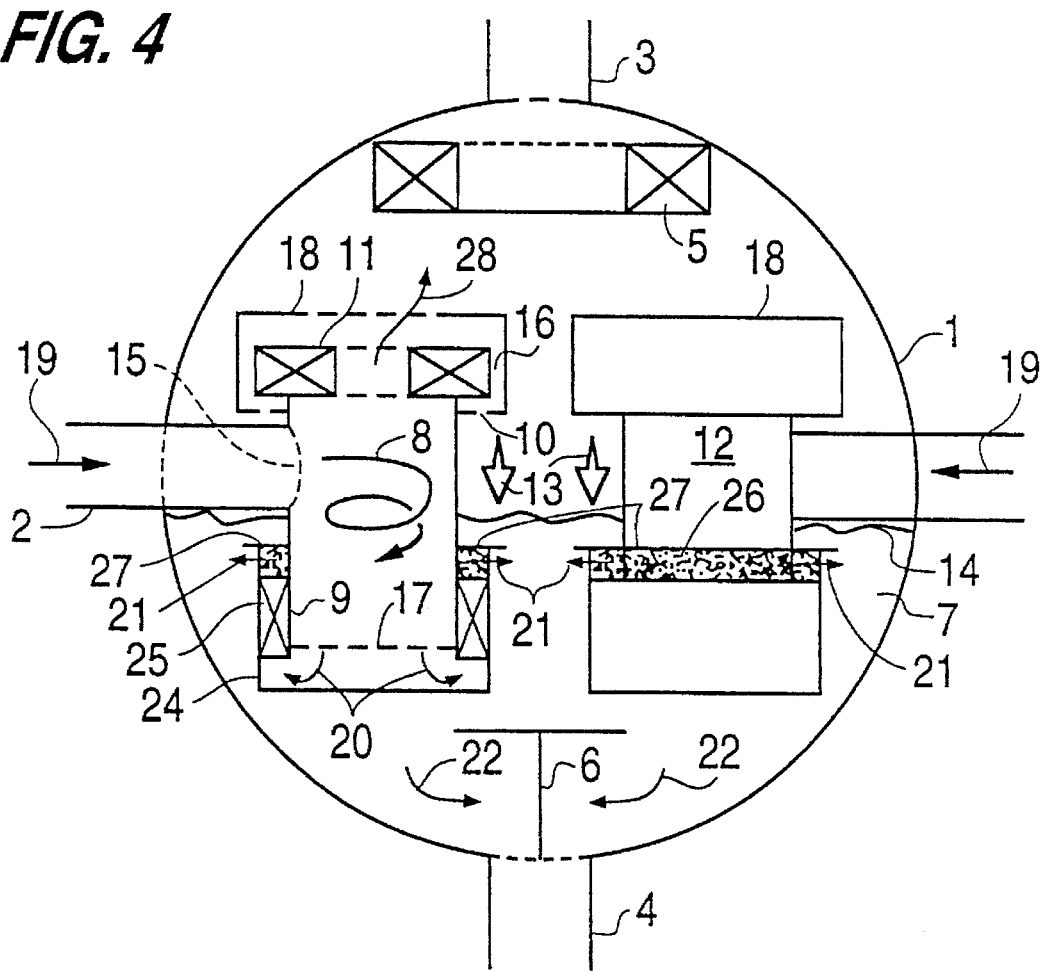
FIG. 4 is a vertical sectional view of a second preferred embodiment of a gas-liquid separating apparatus according to the present invention.

A first preferred embodiment is shown in FIGS. 1 to 3. The gas-liquid separating apparatus employs a perforated plate 23 at the primary isolated water outlet 17 of the cylinder 9 of a separator 12. What is referred to here as a "perforated plate" could be that readily available in the market, and for instance, could be a steel sheet several millimeters thick and punched to produce holes of several millimeters to several tens millimeters in diameter at a constant pitch. The outlet is formed by working this steel sheet into a cylindrical shape and mounting it to a cylinder 9 of the separator. The central axes of the cylinder 9 and cylindrical perforated plate 23 extend vertically, and the perforations of plate 23 extend radially therethrough.

Accordingly, part of the primary isolated water 21 flows into the liquid-phase section of the drum 1 after it has been decelerated by the perforated plate 23. As a result, the velocity of the primary isolated water 20 flowing through the primary isolated water outlet 17 to the liquid-phase section of the drum is decreased as compared to the prior art.

The primary isolated water 21 flowing radially through the perforated plate 23 into the liquid-phase section of the drum 1 also forms an upward flow 21 in the vicinity of the cylinder 9 due to the buoyancy of some steam still entrained in the liquid of the flow and the comparatively slow outflow velocity. Accordingly, the time available for gas-liquid gravitational separation in the liquid-phase section of the drum 1 is longer than in the case of the prior art.

In addition, since the velocity of the primary isolated water 20 flowing out through the primary isolated water outlet 17 to the liquid phase section of the drum 1 is smaller than that in the case of the prior art, the amount of the primary isolated water 20 drawn into the flow 22 within the drum is correspondingly smaller than in the case of the prior art. Therefore, the above-described disadvantage of the heretofore known apparatus can be mitigated.

Second Preferred Embodiment

Figure 5:
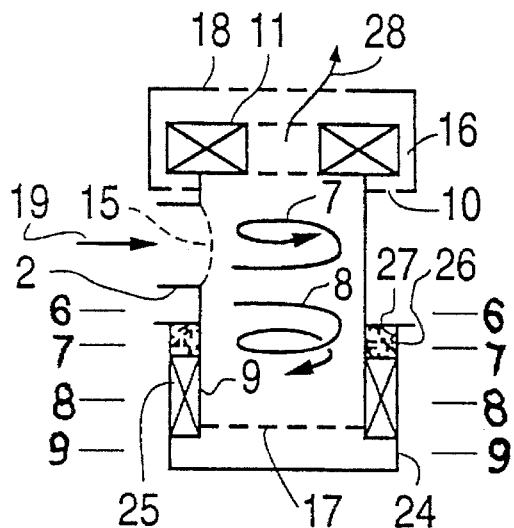
FIG. 5 is a longitudinal sectional view of a separator employed in the gas-liquid separating apparatus shown in FIG. 4.
Figure 6:
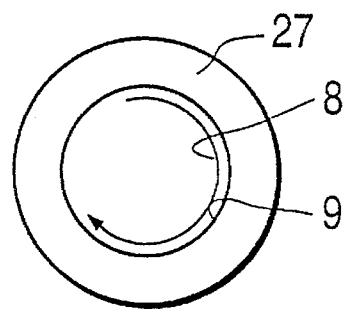
FIG. 6 is a transverse sectional view of the same separator taken along line 6—6 in FIG. 5.
Figure 7:
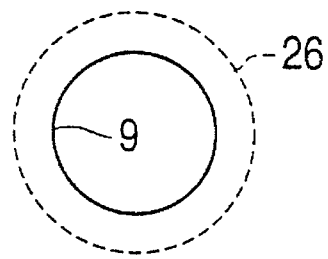
FIG. 7 is a transverse sectional view of the same separator taken along line 7—7 in FIG. 5.
Figure 8:
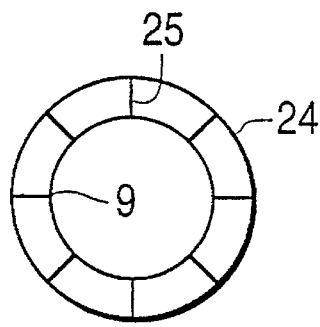
FIG. 8 is a transverse sectional view of the same separator taken along line 8—8 in FIG. 5.
Figure 9:
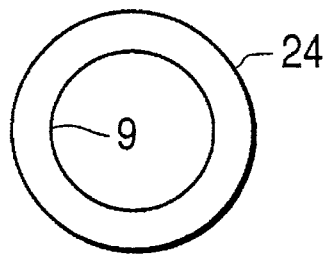
FIG. 9 is a transverse sectional view of the same separator taken along line 9—9 in FIG. 5.

Next, a second preferred embodiment shown in FIGS. 4 to 9 will be described. In this gas-liquid separating apparatus, a rectifier mechanism consisting of an outflow diverting section 24, vortex preventing plates 25 and a perforated plate 26, is provided at the outlet 17 of the cylinder 9 of the separator 12. In this preferred embodiment, as best seen in FIG. 5, the outflow diverting section 24 extends around the cylinder 9 of the separator 12. The outflow diverting section 24 consists of a disc-shaped bottom plate and cylindrical side plate. In addition, the vortex preventing plates 25 are oriented vertically and extend radially, at equal angular intervals, between an inner surface of the side plate of the outflow diverting section 24 and an outer surface of the cylinder 9, as shown in FIG. 8. Furthermore, the cylindrical perforated plate 26 is disposed above the top edge of the side plate of the outflow diverting section 24 as shown in FIGS. 5 and 7, and the top of the annular space between this perforated plate 26 and the cylinder 9 is blocked by a top plate 27 as shown in FIGS. 5 and 6.

The flow 8 of the primary isolated water passes through the primary isolated water outlet 17 while swirling about the center axis of separator 9. Thereafter it is diverted as primary isolated water 20 by the outflow diverting section 24. Subsequently, the swirling of the water 20 about the center axis of the separator 12 is stopped by the vortex preventing plates 25. Further, the velocity at which the water 20 flows toward the liquid-phase section of the drum 1 is decreased by the perforated plate 26, whereupon a primary isolated water flow 21 flows uniformly from the entire perforated plate.

The primary isolated water 21 flowing into the liquid-phase section of the drum 1 flows upwardly in the vicinity of the separator 12 due to the buoyancy of the steam entrained in the primary isolated water 21 and the relatively slow outflow velocity. Furthermore, because the outflow velocity and strength of the flow are low, the primary isolated water 21 will not form a steady flow in the liquid-phase section of the drum 1 as in the case of the prior art.

In other words, the strong and fast in-drum liquid flow 22 directed from the primary isolated water outlet 17 towards the down comer 4 in the heretofore known apparatus shown in FIG. 10 is not generated. The primary isolated water 21 having flowed through the perforated plate 26 of the present invention initially stagnates in the vicinity of the gas-liquid boundary surface 14. Thereafter, it is drawn into the in-drum liquid flow 22 and flows to the down comer 4. Accordingly, the time during which gas-liquid gravitational separation of the primary isolated water 21 in the liquid-phase section of the drum occurs is longer than in the case of the prior art.

In addition, a gas pillar within the cylinder 9 can be stably formed due to an appropriate flow resistance generated by the outflow diverting section 24, the vortex preventing plates 25 and the perforated plate 26. Therefore, a highly efficient gas-liquid separation can be realized over a broader range of flow rates than in the case of the prior art.

As will be obvious from the detailed description of the preferred embodiments above, in the gas-liquid separating apparatus according to the present invention, a perforated plate is provided at a primary isolated water outlet of a separator so that gas-liquid separation can be effected more favorably than in the prior art.

In addition, the rectifier means, consisting of an outflow diverting section, vortex preventing plates and a perforated plate, at the primary isolated water outlet of the separator according to the present invention, also effects a more favorable gas-liquid separation within the drum than in the case of the prior art. In addition, a highly efficient gas-liquid separation can be realized over a broader range of flow rates than in the case of the prior art.

Although preferred embodiments of the present invention have been specifically described above in connection with the accompanying drawings, the present invention is not limited to these preferred embodiment. Various changes and modifications to the configuration and structure of the invention, that are apparent to those of skill in the art, are seen to be within the scope of the present invention as defined by the appended claims.

What is claimed is:

1. A gas-liquid separating apparatus comprising: a container having a downwardly extending outlet at the bottom thereof; and a separator disposed entirely within said container, said separator including a cylinder having a vertically extending central axis and an open bottom, a primary isolated liquid outlet at the bottom of said cylinder, an inlet opening into said cylinder and extending tangentially to said cylinder such that a gas-liquid mixture flowing into said cylinder from said inlet will swirl around the vertical central axis of the cylinder to effect a centrifugal separation of gas and liquid, and a perforated cylindrical plate integral with said cylinder and also having a vertically extending central axis, the perforations of said cylindrical plate extending radially therethrough, the perforations having respective radially inner ends communicating with the open bottom of the cylinder such that the liquid separated in the cylinder and any gas still entrained in the liquid flows through said perforations, and said perforations having respective radially outer ends at which the perforations open directly into the interior of said container such that liquid and any gas still entrained in the liquid flows into the container in the radial direction of said perforated cylindrical plate, thereby facilitating a gravitational separation of said liquid and any gas still entrained in the liquid before the liquid flows out the outlet of said container.

2. A gas-liquid separation apparatus comprising: a container having a downwardly extending outlet at the bottom thereof; and a separator disposed within said container, said separator including a cylinder having a vertically extending central axis and an open bottom, a primary isolated liquid outlet at the bottom of said cylinder, an inlet opening into said cylinder and extending tangentially to said cylinder such that a gas-liquid mixture flowing into said cylinder from said inlet will swirl around the vertical central axis of the cylinder to effect a centrifugal separation of gas and liquid, a perforated cylindrical plate integral with said cylinder and also having a vertically extending central axis, the perforations of said cylindrical plate extending radially therethrough, the perforations having respective radially inner ends communicating with the open bottom of the cylinder such that the liquid separated in the cylinder and any gas still entrained in the liquid flows through said perforations, and said perforations having respective radially outer ends at which the perforations open directly into the interior of said container such that liquid and any gas still entrained in the liquid flows into the container in the radial direction of said perforated cylindrical plate, thereby facilitating a gravitational separation of said liquid and any gas still entrained in the liquid before the liquid flows out the outlet of said container, an outflow diverting section extending from said primary isolated liquid outlet and comprising a wall disposed in a path extending directly between said primary isolated liquid outlet and said outlet of the container to divert said liquid and any gas entrained in the liquid, and vertically oriented vortex-preventing plates extending in said outflow diverting section in the radial direction of said cylinder, said vortex preventing plates being located between the primary isolated liquid outlet of said cylinder and said perforated cylindrical plate such that said liquid and any gas entrained in the liquid impinges said vortex-preventing plates before passing into said container.

3. A gas-liquid separating apparatus as claimed in claim 1, wherein said perforations are holes each having a diameter between several and several tens of millimeters.

4. A gas-liquid separating apparatus as claimed in claim 2, wherein said perforations are holes each having a diameter between several and several tens of millimeters.

5. A gas-liquid separating apparatus as claimed in claim 1, wherein said perforations are an array of holes uniformly spaced from one another.

6. A gas-liquid separating apparatus as claimed in claim 2, wherein said perforations are an array of holes uniformly spaced from one another.

7. A gas-liquid separating apparatus as claimed in claim 3, wherein said holes are uniformly spaced from one another.

8. A gas-liquid separating apparatus as claimed in claim 4, wherein said holes are uniformly spaced from one another.

* * * * *